United States Patent [19]

Tobyama et al.

[11] Patent Number: 5,199,541
[45] Date of Patent: Apr. 6, 1993

[54] ELECTROMAGNETIC CLUTCH FOR A COMPRESSOR

[75] Inventors: Masashi Tobyama, Obu; Masahito Yamashita, Nagoya; Kazushige Murao, Kariya, all of Japan

[73] Assignees: Nippondenso Co., Ltd.; Kabushiki Kaisha Toyoda Jidoshokki Seisakusho, both of Kariya, Japan

[21] Appl. No.: 888,359

[22] Filed: May 27, 1992

[30] Foreign Application Priority Data

May 28, 1991 [JP] Japan ............... 3-038563[U]
Mar. 19, 1992 [JP] Japan ............... 4-014911[U]

[51] Int. Cl.⁵ ................................. F16D 27/10
[52] U.S. Cl. ................................. 192/84 C; 417/317
[58] Field of Search ........ 417/319; 192/84 A, 84 AA, 192/84 AB, 84 B, 84 C

[56] References Cited

U.S. PATENT DOCUMENTS 4,432,446  2/1984  Okano et al. ............... 192/84 C
4,449,622  5/1984  Okano et al. ............... 192/84 C

FOREIGN PATENT DOCUMENTS 6225    1/1988  Japan ............... 192/84 C
96723   4/1991  Japan ............... 192/84 A
134325  6/1991  Japan ............... 192/84 C Primary Examiner—Richard A. Bertsch
Assistant Examiner—Roland McAndrews
Attorney, Agent, or Firm—Cushman, Darby & Cushman

[57] ABSTRACT

A compressor is provided with a housing having a boss portion forming a central bore through which a drive shaft is passed, and a clutch has a rotor rotatably supported by the boss portion through a ball bearing. An armature thereof has a frictional surface facing, with a small gap therebetween, a frictional surface of the rotor, and a holder plate is connected to a surface of the armature opposite that frictional surface by rivets. The holder plate has a tubular portion connected to a hub via an annular cushion rubber, and the hub is in spline engagement with the drive shaft of the compressor. An oil sleeve is oil-tightly fitted to the boss portion and axially passed through a central opening of a cover located on the surface of the armature, opposite the frictional surface thereof. The oil sleeve has at its free end an annular flange shaped oil cut portion radially faced with the cover.

12 Claims, 11 Drawing Sheets

ELECTROMAGNETIC CLUTCH FOR A COMPRESSOR

BACKGROUND OF THE INVENTION

1. Field of the Invention

The present invention relates to an electromagnetic clutch for a compressor used, for example, in an air conditioning apparatus for an automobile.

2. Description of the Related Art

In an air conditioning system for an automobile, a compressor is located in a refrigeration cycle of a refrigerating medium for a compression of the liquid flowing from an evaporator. An electromagnetic clutch is provided for a selective transmission of a rotational movement from a crankshaft of the internal combustion engine to the compressor, the clutch having a rotor rotatably supported at the housing of the compressor. The rotor has a frictional surface which faces, with a small spacing therebetween, a frictional surface of an armature supported by a hub via a holder and spring member, the hub being connected to a drive shaft of the compressor. The refrigeration medium in the compressor includes oil therein, for lubrication purposes, and although an oil seal is provided between the housing and the drive shaft of the compressor, small amount of leakage is inevitable via the oil seal, and the leaked oil, attached to the surface of the housing by its own viscosity, is sometimes transmitted to the frictional surface, if nothing is provided to prevent such a transmission of the leaked oil, and this causes a slippage between the frictional surfaces to occur. Therefore, to prevent such a transmission of leaked oil to the frictional surfaces, Japanese Unexamined Patent Publication No. 63-112630 has disclosed a concept whereby a ring-shaped shield is provided for discharging the leaked oil to the outside of the clutch.

In this prior art, an annular plate cover is connected to the armature on the side thereof opposite the frictional surface thereof, and a ring-shaped shield is connected to an inner peripheral wall of the rotor at a position adjacent to the inner race of the ball bearing, which rotatably supports the rotor on the boss portion of the housing, so that the ring shield extends axially and thus is radially outwardly covered by the annular plate. This arrangement makes its possible for the leaked oil to be diverted by the ring shield, caught by the cover, and exhausted to the outside, without being directed to the frictional surfaces. Nevertheless, under a particular situation caused, for example, by a dimensional limitation of the compressor and/or the clutch, it is sometimes impossible for a seal ring to be mounted in the way proposed by the above prior art disclosed in Japanese Unexamined Patent Publication No. 63-112630, and therefore, it has heretofore been necessary to provide a means for attaining the above-mentioned exhausting of leaked oil even when such a situation arises.

SUMMARY OF THE INVENTION

An object of the present invention is to provide a construction capable of effectively removing a leakage of oil under a clutch even when it is difficult to attach a ring-shaped shield to the rotor.

According to the present invention, clutch-compressor assembly is provided which, in response to a selectively obtained rotational movement transmitted from a source, compresses a fluid to be compressed when required, said assembly comprising:

a housing:

a drive shaft extending axially and rotatably supported about the axis thereof by the housing;

compression means responsive to a rotational movement of said drive shaft for compressing a fluid to be compressed;

said housing defining an axially extending tubular boss portion through which said drive shaft is extended;

seal means arranged between the housing and the drive shaft and adjacent to said boss portion, for a sealing of lubrication oil in the compression means;

a rotor having an axis for a rotation and connected to said source, the rotor having a first frictional surface extending transverse to said axis;

an armature connected to the drive shaft and having a second frictional surface extending transverse to said axis;

means for generating a resilient force to thereby cause the first and the second frictional surfaces to be usually axially spaced at a predetermined distance from each other;

a solenoid which, when energized, generates an electromagnetic force causing the first and second frictional surfaces to be brought into contact with each other against the force of the resilient means;

a ring-shaped cover plate arranged on a second surface of the armature and transverse to the axis of rotation, said second surface being opposite to the frictional surface of the armature;

said cover plate extending radially inwardly so that a central opening thus formed is substantially coaxial with respect to the axis of the drive shaft, and;

an oil sleeve extending coaxially from said tubular boss portion and having a free end extended through said opening;

said oil sleeve defining, at said free end thereof, an annular flange-shaped oil cut portion extending radially outwardly in such a manner that said oil cut portion is located axially outwardly form said opening.

According to the present invention, the oil leaked from the shaft seal is blocked by the oil sleeve, and is formed into drops at the oil cut portion, which drops are directed to the cover, and the oil is then exhausted to the outside by way of the cover. As a result, a wetting of the frictional surfaces of the rotor and armature by the leaked oil is prevented, and thus a lowering of the transmitted torque is effectively prevented.

BRIEF DESCRIPTION OF ATTACHED DRAWINGS

FIGS. 13 (a) to (c) illustrate shapes of various modifications of the oil cut portion.

DESCRIPTION OF THE PREFERRED EMBODIMENTS

Figure 1:
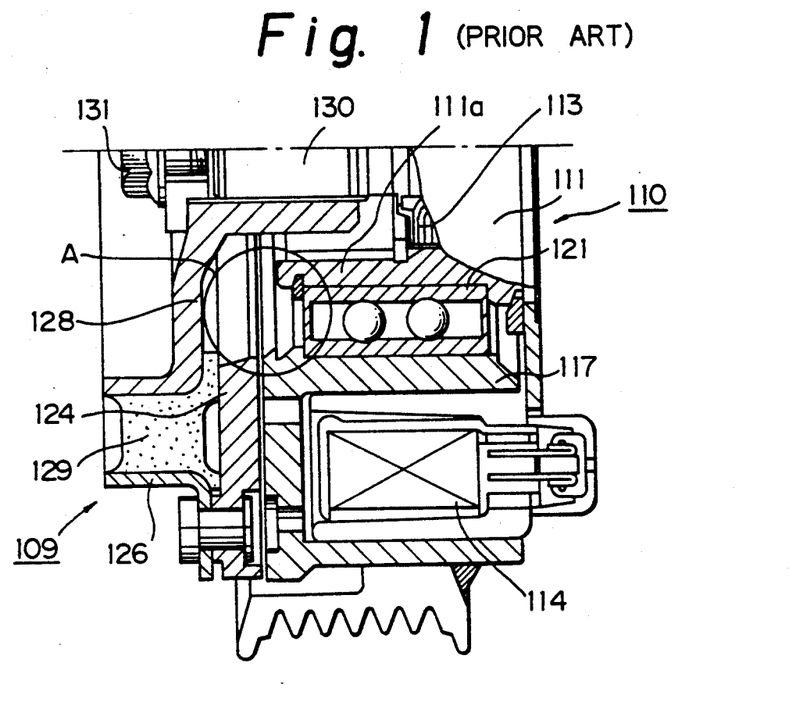
FIG. 1 is partly a cross sectional view of an electromagnetic clutch of a prior art, for illustrating a problem to be solved by the present invention.
Figure 2:
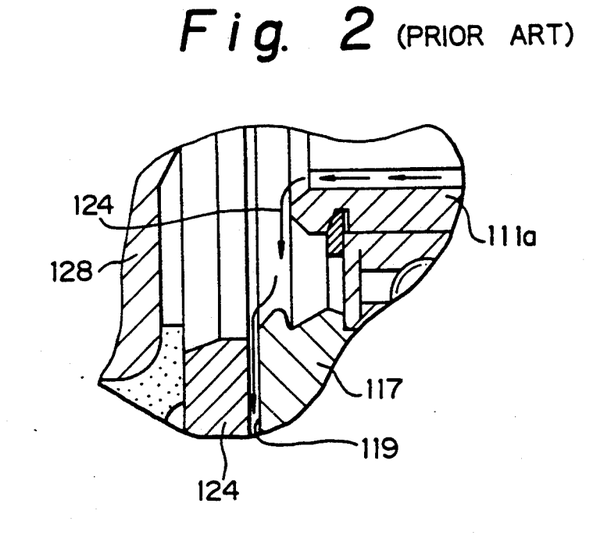
FIG. 2 is an enlarged view of a circled portion A in FIG. 1.

FIGS. 1 and 2 illustrate a problem in a prior art electromagnetic clutch 109 to be solved by the present invention. A compressor 110 has a housing 111 defining a tubular boss portion 111a and a drive shaft 130 extending therethrough, and a clutch has a rotor 117 rotatably connected to a boss portion 111a of a housing 111 via a ball bearing 121, a solenoid 114 housed in an axially opened space formed in the rotor 117, a hub 128 in spline engagement with the drive shaft 130 and fixedly connected thereto by a bolt 131, an annular cushion rubber 129, a holder 126, and an armature 124 connected to the holder 126. The armature 124 has a frictional surface which faces a frictional surface of the rotor 117, and an annular shaft seal 113 of a compressor is arranged between the shaft 130 and the housing boss portion 111a of the housing 111. Oil leaking from the seal to the boss portion of the housing may drop into a space between the armature 124 and the rotor 117, as shown by an arrow 140 in FIG. 2, and this causes the oil attached to the frictional surfaces of the armature 124 and the rotor 117. As a result, a lowering of value of a frictional coefficient of the frictional surfaces is generated, which causes a slippage between the armature 124 and the rotor 117, and accordingly, a lowering of a torque transmitted from the armature 124 to the rotating shaft 130 of the compressor via a holder plate 126, cushion rubber 129 and a hub 128, whereby the performance of the compressor is lowered.

Figure 3:
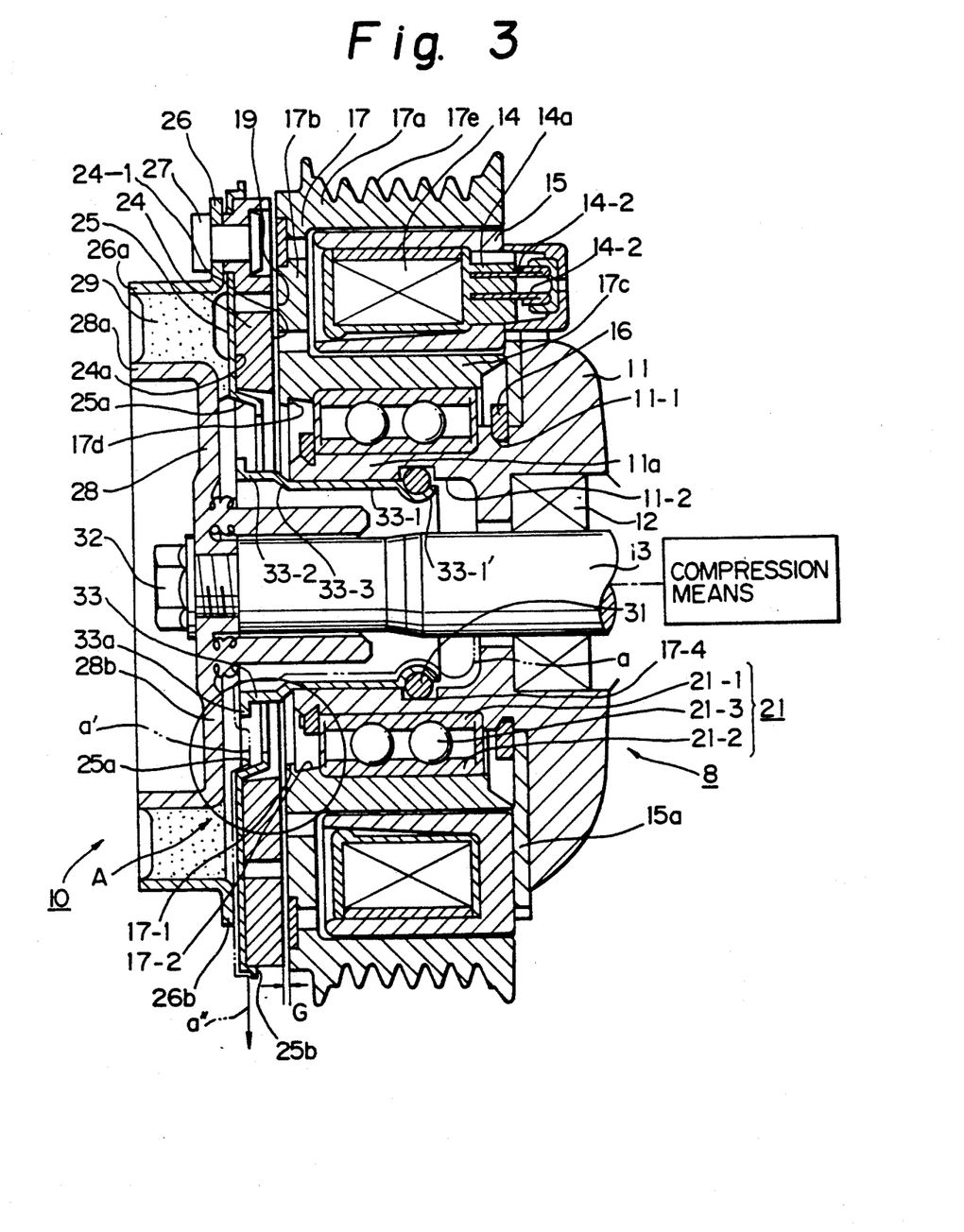
FIG. 3 is an axial cross sectional view of an electromagnetic clutch according to a first embodiment of the present invention.

A construction of the present invention able to solve the above-mentioned drawback of the prior art will now be described. FIG. 3 shows an electromagnetic clutch 10 according to the present invention which is connected to a compressor 8, partly shown in FIG. 3. The compressor 8 has a housing 11 and a rotating shaft 13 rotatably connected to the housing 11, and a compression means of any known structure, as shown by a block in FIG. 3 and including not shown rotary members such as vanes, Roots rotors, scroll members or pistons et al., for defining compression chambers (not shown) to obtain a compression of a fluid in a compressor 8. An annular shaft seal member 12 is arranged between the housing 11 and the rotating shaft 13 for preventing a leakage of the fluid to be compressed in the compression chambers to the outside. An annular solenoid 14 as a coil is held in a bobbin 14a made of a plastic material, and is connected by crimping to a stator housing 15 having a C shape and made of magnetizing material. A pair of terminals 14-1 and 14-2, which are connected to respective ends of the coil 14, are located in the body of the stator housing 15, and are connected via not shown lead wires to an outside power supply (not shown) which, when energized, generates a magnetic flux in a magnetic closed circuit, as fully explained later.

As explained above, the stator housing 15 is made of a magnetizing material, such as a steel, and the stator housing 15 has a closed axial end to which a connection flange 15a is fixedly connected by welding. The connection flange 15a is fixedly connected to the housing 11 by a circlip 16 fitted in an annular groove 11-1 on the housing 11 of the compressor 8. An annular rotor 17 is made of a magnetizing material, and opened space to which the stator housing 15 is closely inserted, so that the rotor 17 is rotated with respect to the stator housing 15 without generating any friction therebetween. The rotor 17 is rotatably supported on a ball bearing assembly 21 on the housing 11. Namely, the ball bearing 21 includes an inner race 21-1 tightly fitted to a boss portion 11a of the housing 11, an outer race 21-2 tightly fitted to the rotor 17, and axially spaced apart two rows of angularly spaced apart balls 21-3.

The rotor 17, which is made of magnetizing material, forms a ring having a C cross sectional shape which defines an outer ring portion 17a, an inner ring portion 17c, and an annular disk portion 17b connecting the outer and inner ring portions 17a and 17c to each other. The outer ring portion 17a, which works as a pulley, forms, at its outer cylindrical surface, annular groove 17e having a V cross sectional shape, with which belts from a not shown pulley on a crankshaft of the internal combustion engine are engaged for transmitting a rotational movement from the crankshaft to the rotor 17. The annular disk portion 17b of the rotor 17 forms a frictional surface 19 extending transverse to the axis of the rotating shaft 13.

Figure 4:
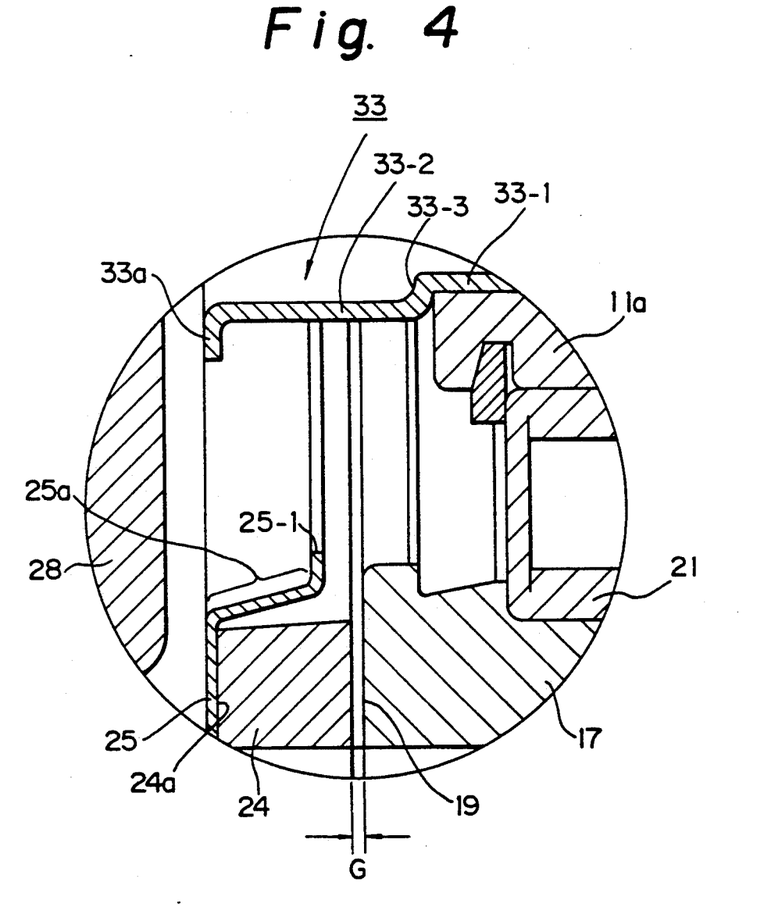
FIG. 4 is an enlarged view of a circled portion A in FIG. 3.

An armature 24 has a ring shape and is made of a magnetizing material. The armature 24 has a frictional surface 24-1 which faces the frictional surface 19 of the rotor with a small spacing G therebetween. The armature 24 has, at an end opposite form the frictional surface 24-1, a cover plate 25 connected thereto by an adhesive. The cover 25 is made by stamping a plate of a non-magnetizing material such as aluminum. The cover 25 has an inner bent (tapered) portion 25a (FIG. 4) directly axially inwardly of the armature 24 for guiding a flow of lubricant oil, as will fully described later, and an outer bent portion 25b (FIG. 3) engaged with the outer periphery of the armature 24. Arranged on the side of the cover plate 25 remote from the armature 24 is an armature holder 26 having a tubular portion 26a, which extend axially, and a flange portion 26b to which the armature 24 together with the cover 25 are connected by equiangularly spaced rivets 27. Arranged inside the holder plate 26 is a hub 28 having a sleeve portion 28a and a disk portion 28b connected to an end of the rotating shaft 13 by a bolt 32. An annular cushion rubber 29 is arranged between the holder 28 and the hub 28 so that the cushion rubber 29 is connected at its outer surface to the tubular portion 26a of the holder 26 by an adhesive, and at its inner surface is connected to the sleeve portion 28a of the hub 28 by an adhesive. The cushion rubber 29 generates an elastic force for urging the frictional surface 24-1 of the armature 24 to be spaced from the frictional surface 19, and for reducing a shock generated when the armature 24 comes into contact with the frictional surface 19 of the rotor 17 when the solenoid 14 is energized for engaging the clutch.

The rotor 17 has, at its inner cylindrical surface adjacent to the frictional surface 19, an annular projected portion 17-1 and an annular portion 17-2 having an outwardly tapered shape, whereby an annular groove 17d is formed at a location at which the projected portion 17-1 is connected to the tapered portion 17-2. This groove 17d can hold any amount of oil leaked from the bearing assembly 21, to thereby prevent the leaked oil from being directed onto the frictional surface 19 of the rotor 17, which otherwise would cause a slippage to be easily generated between the armature 24 and the rotor 17 when they are engaged.

An oil sleeve 33 has a substantially circular cylindrical shape, and is produced by stamping from a steel plate. The oil sleeve 33 has a portion 33-1 having a reduced diameter, an outer portion 33-2 having an increased diameter, and a portion 33-3 for connecting the inner and outer portions 33-1 and 33-2. The inner portion 33-1 is press fitted to a bore 11-2 inside the boss portion 11a of the housing 11 of the compressor 8, until the shoulder portion 33-3 abuts against the end wall of the boss portion 11a of the housing 11. The inner portion 33-1 has, at its innermost end, an annular groove 33-1, on which an O-ring 31 is fitted so that the O-ring 31 is in contact with the inner cylindrical surface of the rotor 17 at an inner annular groove 17-4. The free end of the oil sleeve 33 extends axially to a position such that a flange portion 33a as an oil cut portion at the end of the portion 33-2 is located on substantially the same plane as that of the surface 24a of the armature 24, and opposite to the frictional surface 24-1 of the armature 24. As shown in detail in FIG. 4, the outer portion 33-2 of the oil sleeve 33 is axially passed through the cover 25 at its central opening 25-1, so that the oil cut portion 33a, as a radial flange at the end of the sleeve 33, radially faces the oil guide portion 25a of the cover 25.

It should be noted that the present invention is not limited to the press fitting construction of the oil sleeve 33 stamped from a steel plate to the boss portion 11a of the housing 11, as explained with reference to the drawings. Namely, a different material or different construction or way of fitting can be employed. Also, the oil sleeve 33 can be made from any metal material, or even a plastic material, which can prevent an infiltration of lubrication oil, such as copper or stainless steel. Any connection means can be employed if the oil sleeve 33 can be firmly connected to the housing 11 of the compressor, and therefore, a welding or adhesive can be employed for connecting the oil sleeve 33 to the housing 11.

Now, the operation of the electromagnetic clutch according to the present invention will be explained. When the compressor 8 is to be operated, the solenoid 14 is connected to an electric power source (not shown) and thus is energized, whereby a closed circuit of a magnetic flux is created via the stator housing 15, the rotor 17 and the armature 24. As a result, the armature 24 is moved axially against the electric force of the cushion rubber 29, so that the frictional surface 24-1 of the armature 24 is brought into contact with the frictional surface 19 of the rotor 17. The rotation of the rotor 17, which is applied from the crankshaft of the internal combustion engine (not shown) via the V-belt (not shown), is transmitted to the armature 24 and then to the hub 28, via the cushion rubber 29, and further, to the shaft 13 of the compressor 8, which allows the compressor means in the compressor to compress the fluid.

When the solenoid 14 is de-energized, the electromagnetic force between the armature 24 and the solenoid 14 is reduced and the elasticity of the cushion rubber 29 causes the armature 24 to be detached from the frictional surface 19 of the rotor 17 so that a gap G is created between the frictional surfaces 19 and 24-1, whereby compressor 8 is disconnected from the rotational movement from the internal combustion engine, to thus stop the compression operation.

When a leakage of lubrication oil included in the fluid to be compressed from the compressor chambers (not shown) via the oil seal unit 12 occurs, as shown by a portion a of a phantom line in FIG. 3, the leaked oil is caught by the oil sleeve 33 via a bottom portion of the bore 11-2 in the boss portion 11a of the housing 11. The oil then moves onto the portion 33-1, 33-3 and 33-2 oil sleeve 33 and is dropped, via the oil cut portion 33a of the oil sleeve 33, onto and is caught by the oil guide portion 25a of the cover 25, as shown by a portion a' of the phantom line. The oil is finally vertically transmitted along the cover 25 on the surface facing the hub 28, the cushion rubber 29 and the holder 26, as shown by a portion a" of the phantom line. This means that the construction of the oil sleeve 33 having the oil cut portion 33a opened to the guide portion 25a of the cover 25 can prevent a transmittal of the leaked oil to the frictional surface 24-1 of the armature 24 and the frictional surface 19 of the rotor 17. Namely, the oil cut portion 33a as a flange portion directed radially at the end of the oil sleeve 33 can form the leaked oil into droplets to be dropped downwardly, which prevents the friction surfaces from being wetted by the leaked oil. Contrary to this, in the prior art with no provision of the oil sleeve, the leaked oil can be transmitted to the outer cylindrical wall of the boss portion and attached thereto under its own viscosity, which may cause the surface to be wetted by the oil, and the oil to be transmitted to the frictional surfaces as described with reference to FIG. 1 and 2.

Figure 5:
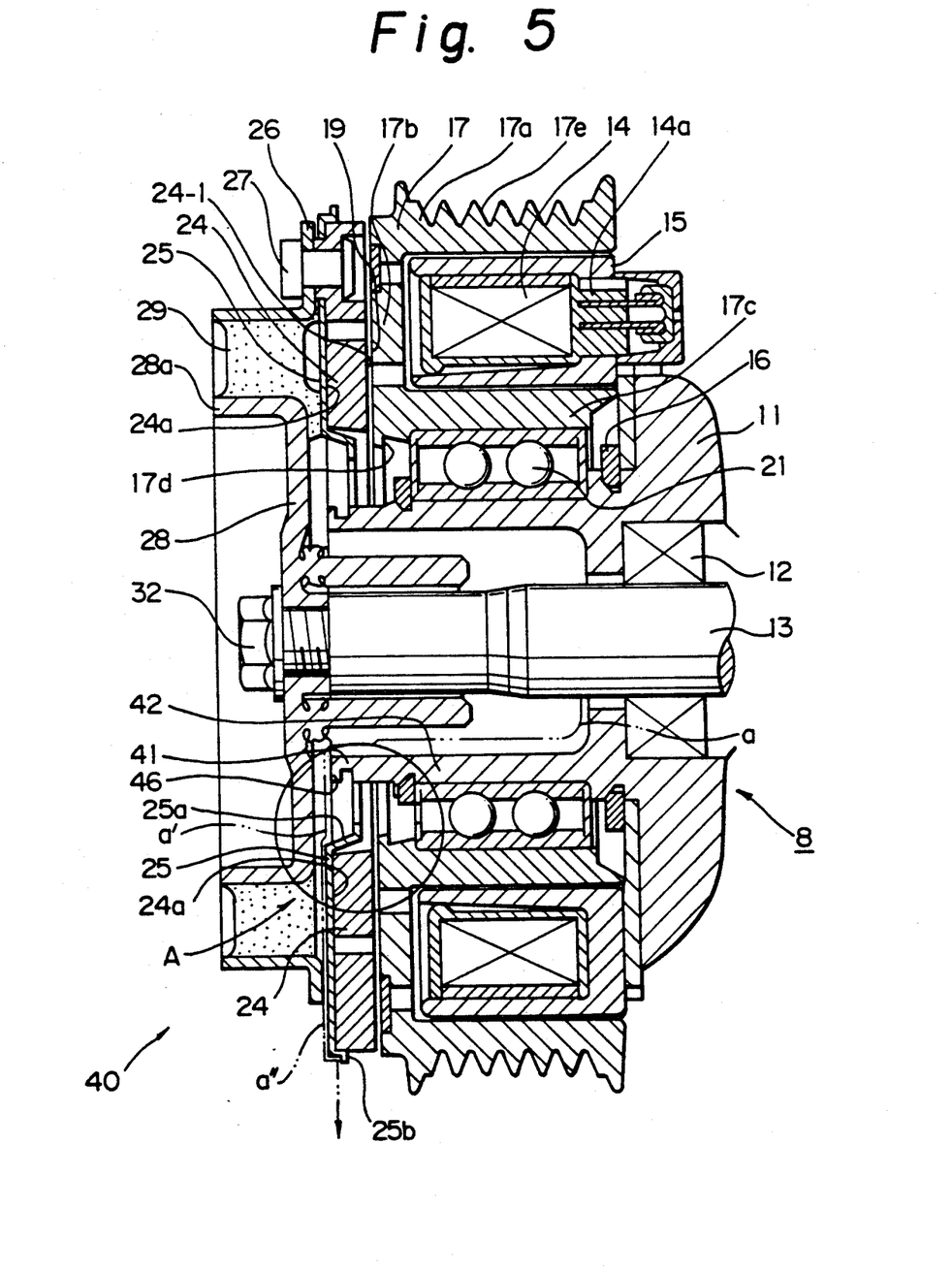
FIG. 5 is an axial cross sectional view of an electromagnetic clutch according to a second embodiment of the present invention.
Figure 6:
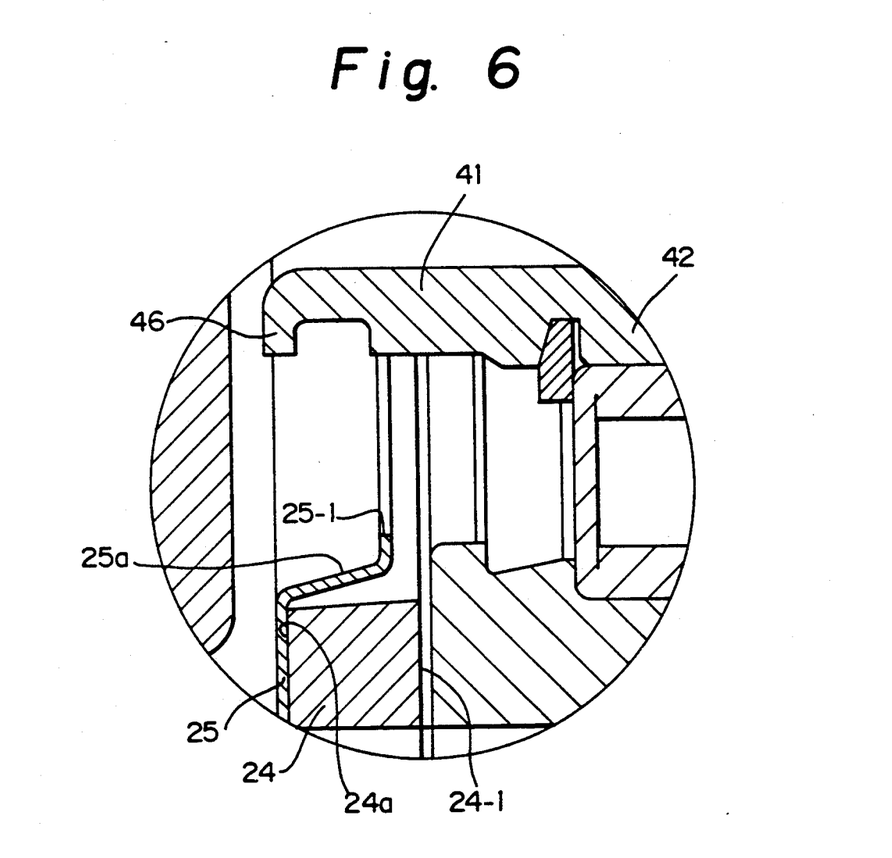
FIG. 6 is an enlarged view of a circled portion A in FIG. 5.

FIGS. 5 and 6 show an electromagnetic clutch 40 in a second embodiment. In this embodiment, in place of providing the separate oil sleeve 33, made by stamping from a steel sheet, which is oil-tightly fitted to the boss portion 11a of the housing via the O-ring 31 as in the first embodiment in FIG. 3, the housing 11 has a boss portion 42 to which the oil sleeve 33 in the first embodiment is integrally incorporated. Namely, the boss portion 42 of the housing forms, at its free end, an oil sleeve portion 41 which is extended through the central opening 25-1 (FIG. 6) of the cover 25, so that the oil sleeve portion 41 defines at its end an oil cut portion 46 as an annular flange portion directed outwardly on a plane in which the surface 24a of the armature 24 opposite the frictional surface 24-1 is located. As a result, a construction is also obtained wherein the oil cut portion 46 is located above and faces the guiding portion 25a, so that the oil leaked from the oil seal 12 on the bottom inner wall of the boss portion 42 as shown by the arrow a is directed, via the guide portion as shown by the arrow a, to the cover plate 25 and flows therealong as shown by the arrow a", to thus prevent the leaked oil from being directed to the frictional surfaces 24-1 and 19 of the armature 24 and the rotor 17, respectively. Namely, the oil sleeve portion 41 and the oil cut portion 46 in the second embodiment operate in the same way as the oil sleeve 33 and the oil cut portion 33a of the first embodiment.

Figure 7:
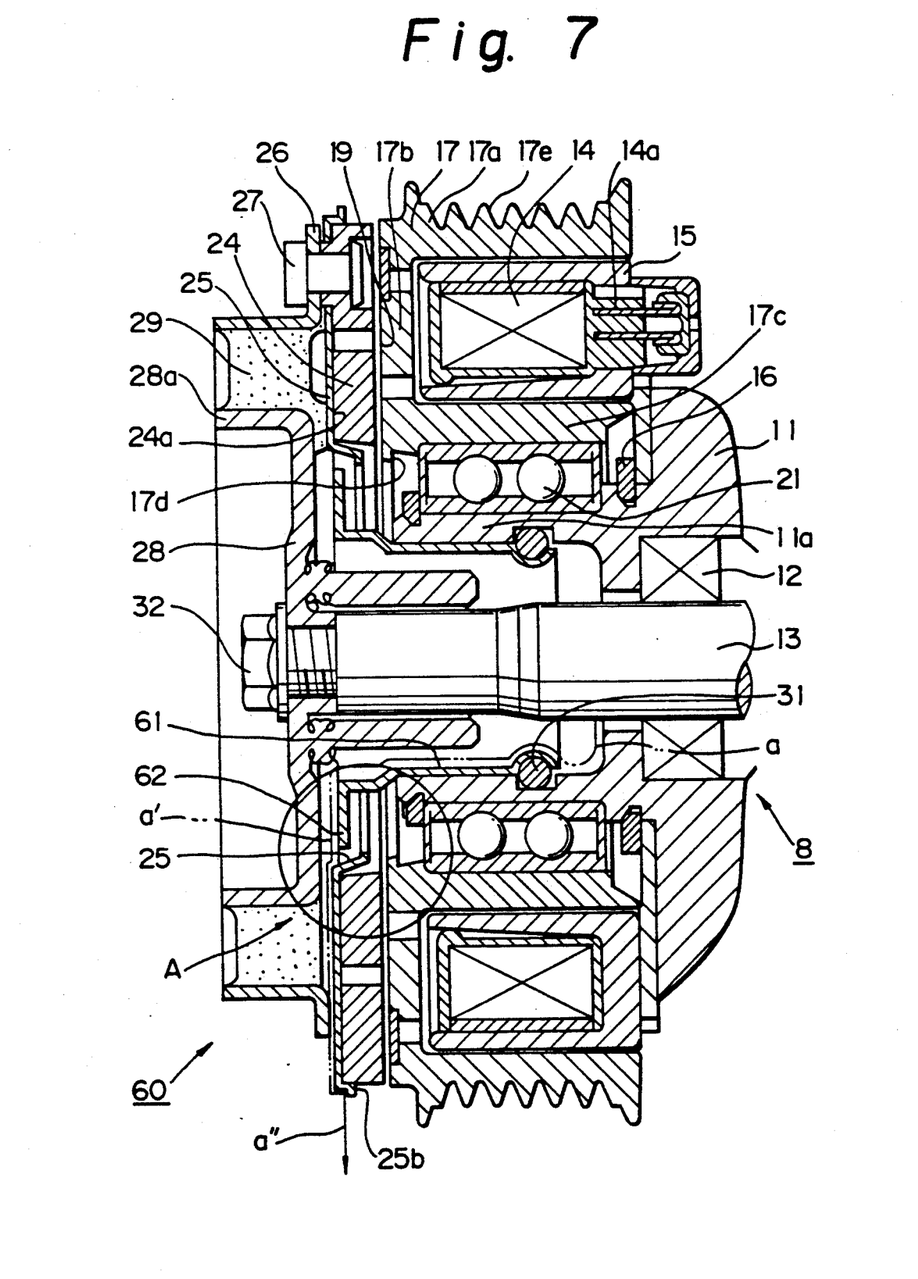
FIG. 7 is an axial cross sectional view of an electromagnetic clutch according to a third embodiment of the present invention.
Figure 8:
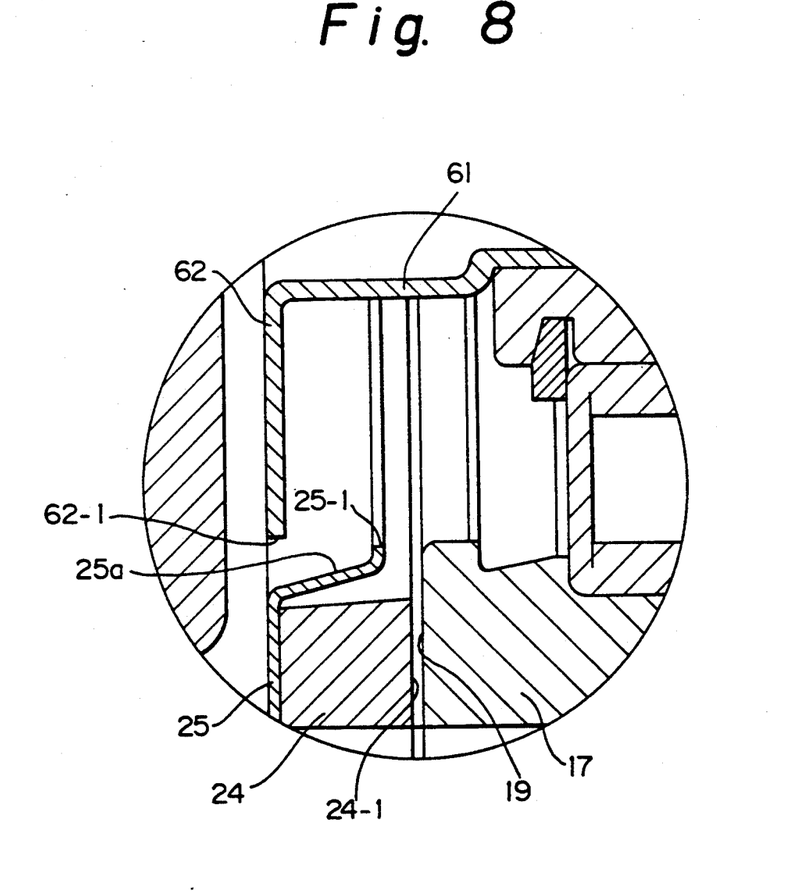
FIG. 8 is an enlarged view of a circled portion A in FIG. 7.

FIG. 7 and 8 show an electromagnetic clutch 60 in a third embodiment, which includes an oil sleeve 61 of substantially the same construction as the oil sleeve 33 of the first embodiment in FIG. 3. The oil sleeve 61 in this embodiment is different from the oil sleeve 33 in that the oil sleeve 61 has an oil cut portion 62 extended radially toward the guide portion 25a (FIG. 8) of the cover 25, so that the flange portion 62 completely covers the central opening 25-1 of the cover 25, axially, while preventing an outer periphery 62-1 of the portion 62 from coming into contact with the cover 25. The construction of this embodiment other than this point is similar to that of the first embodiment, and therefore, an explanation thereof will be omitted. This construction can effectively guide the leaked oil downwardly along the guide plate without allowing same to be introduced to the frictional surface 24-1 of the armature 24 and the frictional surface 19 of the rotor 17.

Figure 9:
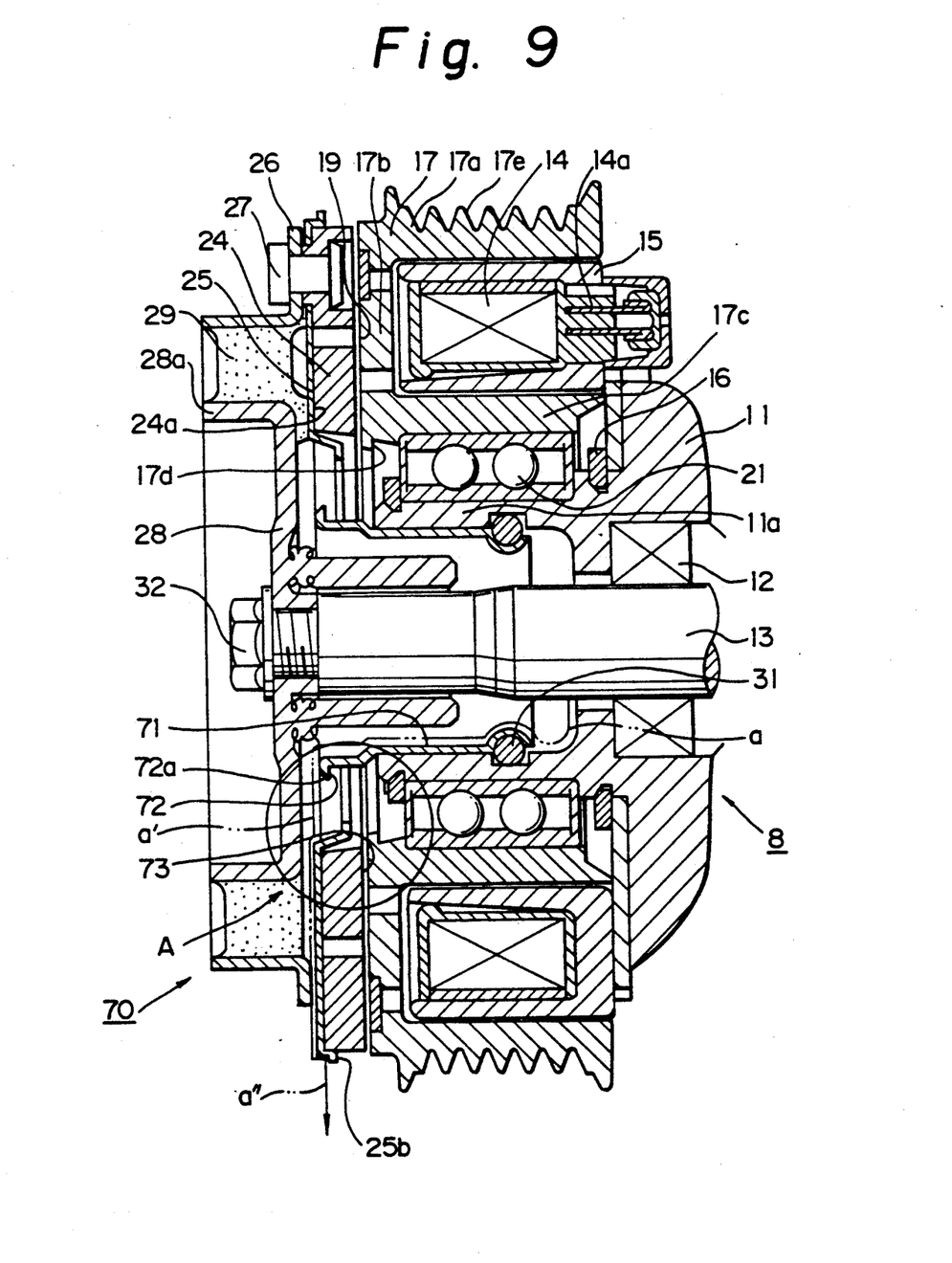
FIG. 9 is an axial cross sectional view of an electromagnetic clutch according to a fourth embodiment of the present invention.
Figure 10:
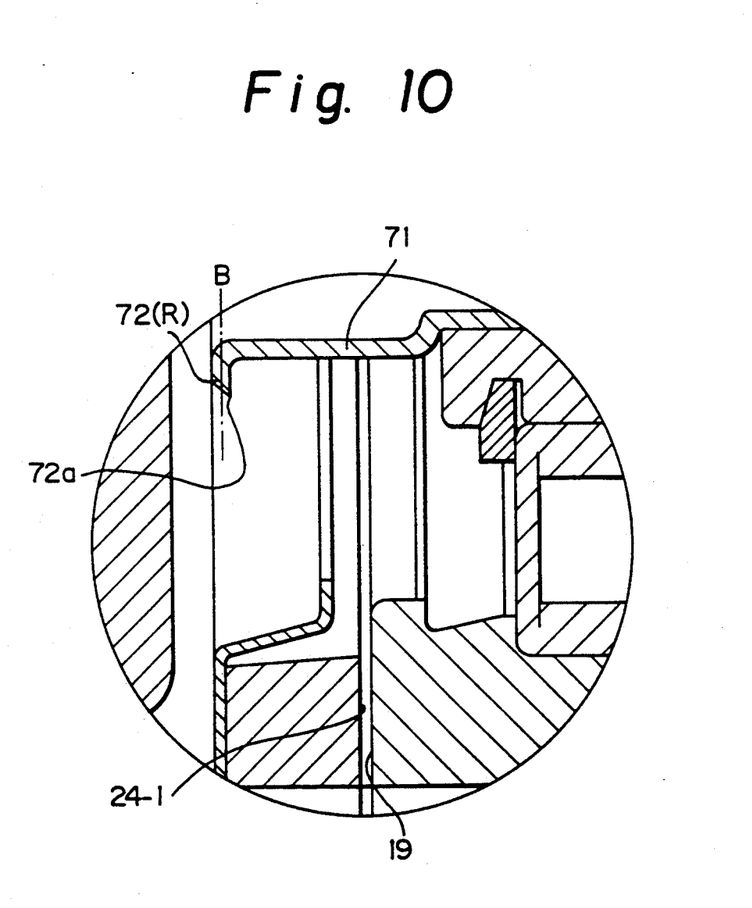
FIG. 10 is an enlarged view of a circled portion A in FIG. 9.

FIGS. 9 and 10 show an electromagnetic clutch 70 in a fourth embodiment, which includes an oil sleeve of substantially the same construction as the oil sleeve 33 of the first embodiment in FIG. 3, but is different therefrom in that the oil sleeve 71 has an oil cut portion 72 which is beveled with a curvature R so that a pointed outer peripheral edge 72a (FIG. 10) is obtained; the pointed edge 72a being offset axially inwardly from a vertical center line B of the oil blocking portion 72a. The construction of this embodiment other than this point is similar to that of the first embodiment, and therefore, any explanation thereof will be omitted. The construction of the oil cut portion 72 is advantageous over the portion 33a (FIG. 4) of the first embodiment in that the leaked oil can be positively separated into droplets.

Figure 11:
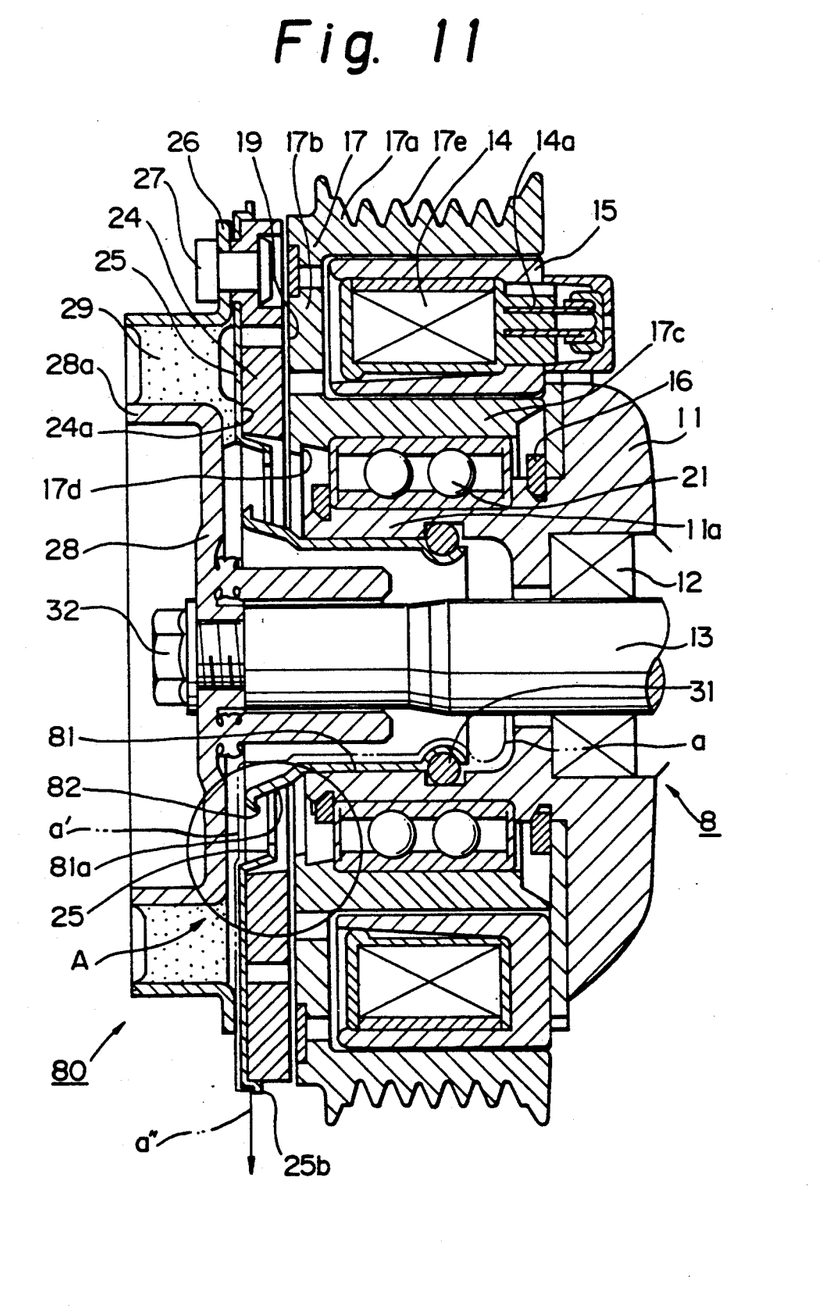
FIG. 11 is an axial cross sectional view of an electromagnetic clutch according to a fifth embodiment of the present invention.
Figure 12:
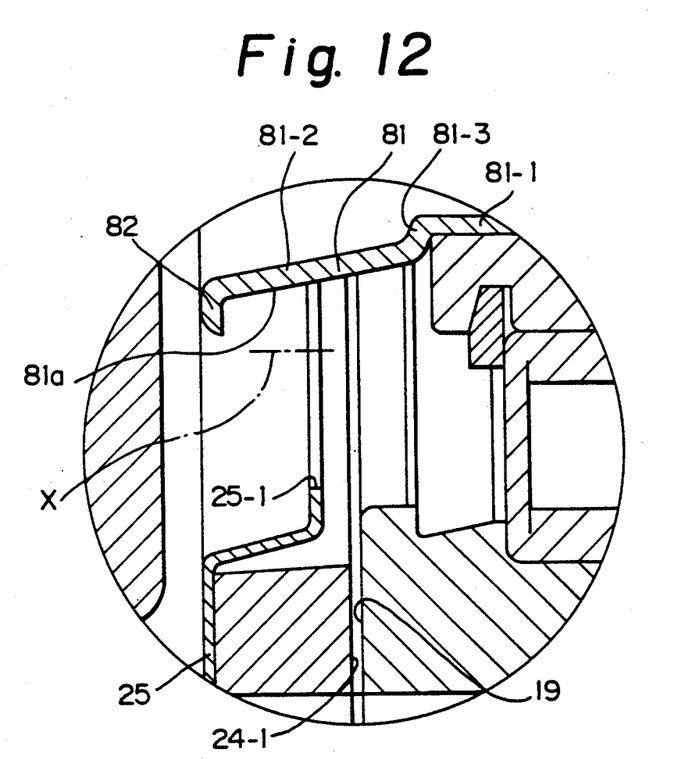
FIG. 12 is an enlarged view of a circled portion A in FIG. 11.

FIGS. 11 and 12 show an electromagnetic clutch 80 in a fifth embodiment, which has an oil sleeve 81 having the same construction as that of the fourth embodiments in FIGS. 9 and 10, except that the oil sleeve 81 has, in addition to an inner portion 81-1 and connecting portion 81-3, an outer widened portion 81-2 which is widened axially outwardly toward the oil cut portion 82. The construction of this embodiment other than this point is similar to that of the fourth embodiment in FIGS. 9 and 10, and therefore, an explanation thereof will be omitted. The tapered portion 81-2 can prevent the leaked oil from being directed onto the frictional surfaces, even if a transmission of the leaked oil to the rear surface 81a occurs without a forming of droplets at the oil blocking portion 82.

As a modification, an advantageous construction is that wherein the inner periphery of the central opening 25-1 of the cover is located at a higher position X in FIG. 12, so that the leaked oil transmitted to the outer surface 81a of the oil sleeve is blocked, and thus cannot be transmitted to the frictional surface 24-1 and 19.

Figure 13A:
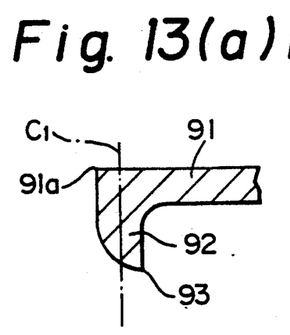
Figure 13B:
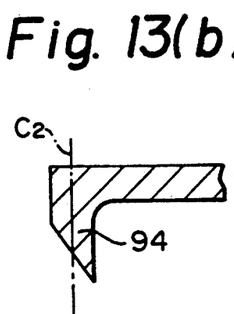
Figure 13C:
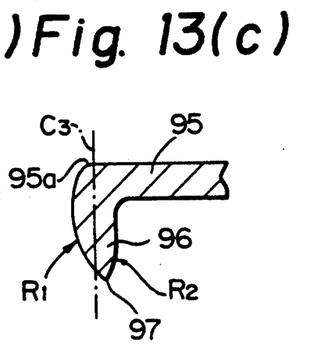

FIGS. 13(a), 13(b) and 13(c) show modification of cross sectional views of the oil blocking portion. In FIG. 13(a), an oil cut portion 92 is, at its outer axial side, beveled with a curvature so that a pointed edge 93 is created inwardly (right hand direction in FIG. 13(a)) from the central line C of the oil cut portion 92. It should be noted that an inner edge 91a of the flange portion 92 is not bevelled, and thus an acute right angle is created. FIG. 13(b) shows another cross sectional shape of the oil cut portion 94, which is different from the oil cut portion 92 in FIG. 13(a) in that the bevelled portion is not rounded. In FIG. 13(b), $C_2$ is a vertical central line of the oil cut portion 94. FIG. 13(c) shows another oil cut portion 96 which is bevelled not only at the axially outer side but also at the axially inner side, with respective curvatures, so that an inner edge 97 is created to be located inwardly of the vertical center line $C_3$ of the oil cut portion 96. A radius R at the outer side is different from the radius $R_2$ at the inner side. Furthermore, it should be noted that an inner edge 95a of the flange portion 96 is bevelled so that a rounded right angle is created. The modifications shown by FIGS. 13(a) to 13(c) can obtain an increased oil blocking efficiency when compared with the shape of the oil cut portion 33a in the first embodiment in FIG. 4.

While embodiment of the present invention are described with reference to attached drawings, many modifications and changes can be made by those skilled in this art, without departing from the scope and spirit of the present invention.

We claim:

1. In a connected construction between an electromagnetic clutch and a compressor, wherein the compressor has a housing having a boss portion defining an axial opening, and a drive shaft which is rotatably supported at the housing and passed through the opening via a shaft seal member, and wherein the electromagnetic clutch has a rotor rotatably supported at the boss portion, a solenoid stationarily arranged in an annular space formed in the rotor, an armature arranged so as to axially face the rotor, a holder for holding the armature, a hub which is connected to the drive shaft of the compressor, and an annular cushion rubber arranged between the holder and the hub for an elastic connection of the armature with the drive shaft, the improvement comprising, in combination, an annular cover which is arranged on a surface of the armature opposite the surface thereof facing the rotor, the cover having a central opening, and an annular oil sleeve extending coaxially from said tubular boss portion which includes a free end extended through said opening of the cover, said oil sleeve defining, at its free end, an annular flange shaped oil cut portion extending radially outwardly in such a manner that said oil cut portion is located axially outwardly from said opening.

2. A clutch-compressor assembly, responsive to a selectively obtained rotational movement transmitted from a source, for compressing a fluid to be compressed when required, said assembly comprising:

a housing;

a drive shaft which extends axially and which rotatably supported about its axis by the housing;

compression means, responsive to the rotational movement of said drive shaft, for obtaining a compression of a fluid to be compressed;

said housing defining an axially extending tubular boss portion through which said drive shaft extends;

seal means arranged between the housing and the drive shaft adjacent to said boss portion for obtaining a sealing of lubrication oil in the compression means;

a rotor having an axis for a rotation, and connected to said source, the rotor having a first frictional surface extending transverse to said axis;

an armature connected to the drive shaft and having a second frictional surface extending transverse to said axis;

means for generating a resilient force for causing the first and the second frictional surface to be usually axially spaced at a predetermined distance therebetween;

a solenoid which, when energized, generates an electromagnetic force which allows the first and the second frictional surfaces to be brought into contact with each other against the force of the resilient means;

a ring shaped cover plate arranged on a second surface of the armature transverse to the axis, said second surface being opposite the frictional surface of the armature;

said cover plate extending radially inwardly so that a central opening is formed which is substantially coaxial with respect to the axis of the drive shaft, and;

an oil sleeve extending coaxially from said tubular boss portion which includes a free end extended through said opening;

said oil sleeve defining, at said free end, an annular flange shaped oil cut portion extending radially outwardly in such a manner that said oil cut portion is located axially outwardly from said opening.

3. An assembly according to claim 2, wherein said oil cut portion is, at an outer axial end thereof, bevelled so that the oil cut portion forms, at its cross section along said axis, a radially inwardly directed edge which is located axially inwardly with respect to a vertical, axis of the oil cut portion.

4. An assembly according to claim 3, wherein said bevelled portion is outwardly rounded.

5. An assembly according to claim 4, wherein said oil cut portion is also bevelled at its inner axial end.

6. An assembly according to claim 2, wherein said cover has an inner portion adjacent to said opening, which inner portion is axially inwardly tapered toward said opening so that the oil cut portion of the oil sleeve, faces said tapered portion.

7. An assembly according to claim 2, wherein said oil sleeve is an integral part of said boss portion of the compressor.

8. An assembly according to claim 2, wherein said oil sleeve is made of member which is separate from the boss portion of the housing of the compressor, said separate oil sleeve being tightly fitted to an axial opening of the boss portion.

9. An assembly according to claim 8, further comprising a O-ring member located between the separate the oil cut portion of the oil sleeve.

10. An assembly according to claim 8, wherein said separate oil sleeve has an axially inner portion which is tightly fitted to said axial opening of the boss portion, an axially outer portion extending out of the boss portion of the housing of the compressor and defining said oil cut portion at its free end, and a middle tapered portion for connecting the inner portion and the outer portion to each other.

11. An assembly according to claim 10, wherein said outer portion is axially outwardly widened toward the oil cut portion.

12. An assembly according to claim 2, wherein said oil cut portion extends radially so that substantially radially fully covers said opening of the cover plate.

* * * * *